Patented June 2, 1936

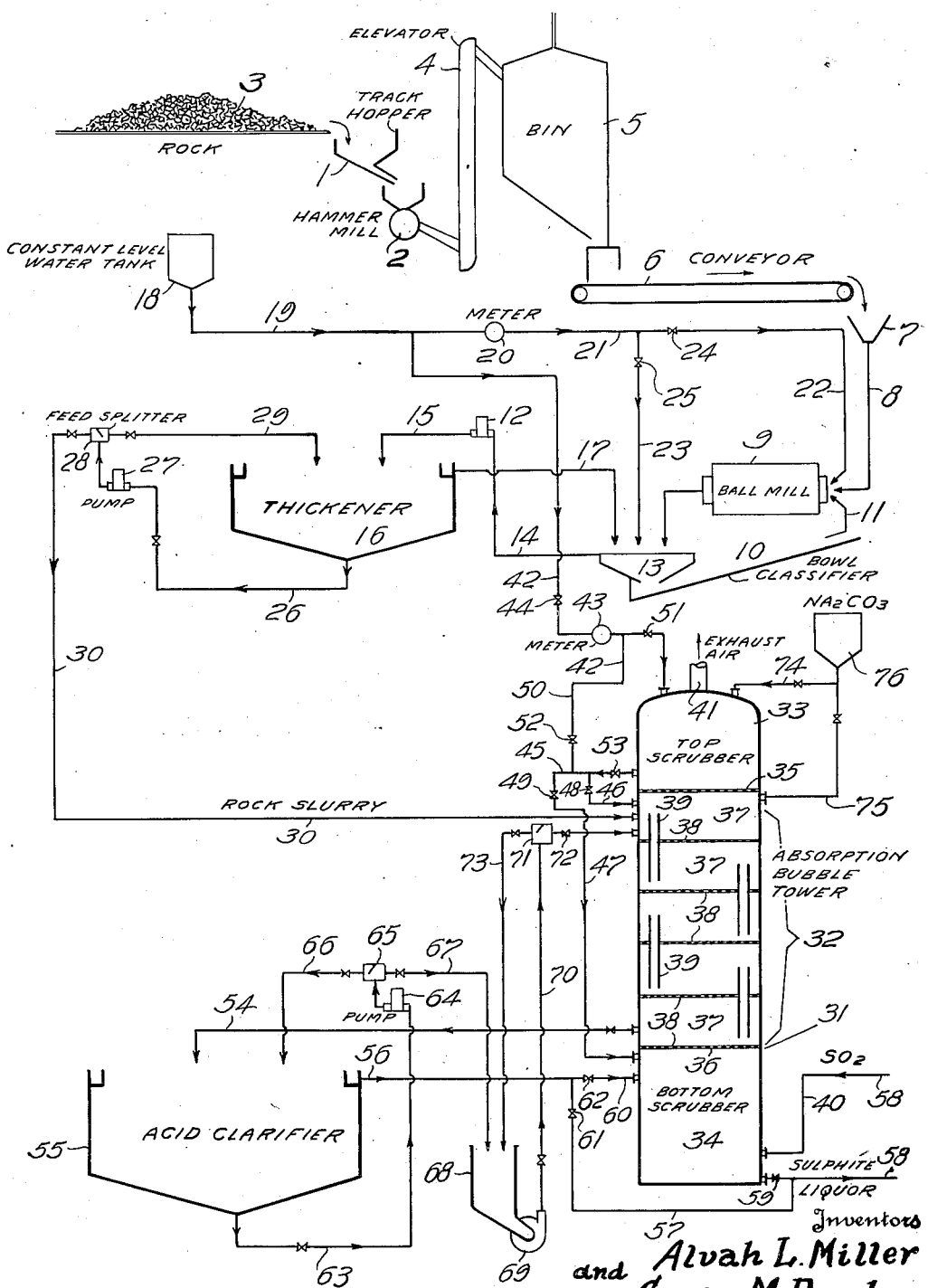

2,042,477

UNITED STATES PATENT OFFICE 2,042,477

MANUFACTURE OF BISULPHITE LIQUOR

Alvah L. Miller, Croton, N. Y., and George M. Darby, Westport, Conn., assignors, by mesne assignments, to The Dorr Company, Inc., New York, N. Y., a corporation of Delaware Application February 12, 1931, Serial No. 515,266

17 Claims. (Cl. 23—132)

The present invention relates to the manufacture of bisulphite liquor such as used in the digestion step in the manufacture of pulp such as wood or other pulp.

The raw bisulphite liquor produced according to this invention is preferably obtained from natural alkaline earth or basic rock such as raw limestone or dolomite in reaction with $SO_2$.

It is to be understood that dolomite varying in magnesium content may also be used as the full equivalent of limestone and dolomite. That is to say, the composition of naturally occurring dolomitic limestones varies in Mg–Ca ratio from what is essentially largely calcite ($CaCO_3$) with small amounts of magnesite ($MgCO_3$) present to what is essentially largely magnesite with a small amount of calcite ($CaCO_3$) present.

A desirable feature in the use of raw limestone is its cheapness as compared with that of burnt limestone, but this advantage is considerably offset in its use as heretofore practiced because of the necessity for relatively large absorption towers to permit the relatively long detention of the limestone therein necessary for complete reaction, the inability to use substantially all of the sulphur-dioxide in the mixture of gases containing the sulphur-dioxide supply, and lack of both stable control of the process and uniformity of product.

Important objects of this invention are to derive a method of improved control for the bisulphite liquor making process to the end of obtaining more positive control of the character of the end product; to establish greater flexibility of operation; and to increase the efficiency of the reaction tower in terms of lime dissolved per cubic foot of reaction space and in terms of exhaustive utilization of the $SO_2$.

The production of the raw bisulphite liquor, for use in the wood digestion step, involves a chemical reaction between an alkaline earth base (such as CaO, MgO or a mixture of same) and a sulphur dioxide bearing gas in the presence of water. A typical reaction employed may be written as follows:

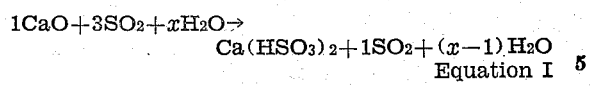

Equation I wherein the resultant products leave the reaction zone as a solution phase known as raw bisulphite liquor, or where a mixture of CaO and MgO are employed (as with dolomitic lime) as follows:

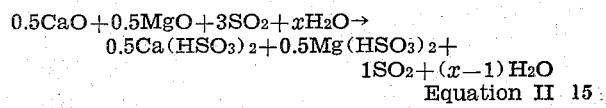

Equation II wherein the reaction products again leave the reaction zone as a solution phase likewise known as raw bisulphite liquor. Obviously, it is necessary, when employing the above reactions, to decompose naturally occurring limestones (calcite, essentially $CaCO_3$ or dolomite, essentially Mg—$Ca(CO_3)_2$) in a separate operation to produce the desired oxides.

In the case of limestone consisting primarily of calcite (or similar forms of $CaCO_3$ found in nature) present practice avoids the limestone ($CaCO_3$ to CaO) decomposition step by employing the following reaction (comparable to Equation I above):

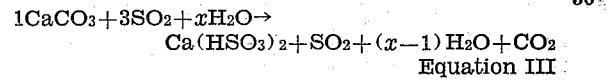

Equation III wherein the reaction product carbon dioxide ($CO_2$) leaves the reaction zone as a gas while the remaining reaction products leave said zone as a solution phase.

Referring again to Equation III, it is common practice to effect this reaction in two stages, so as to produce in the first stage a semi-finished raw bisulphite liquor containing approximately

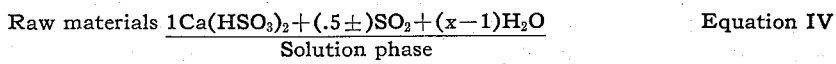

Equation IV and then to enrich this semi-finished solution with varying amounts of $SO_2$ to produce

Equation V the finished liquor.

In present practice the amount of unbound $SO_2$ in the effluent from the first of these stages fluctuates to a considerable extent depending upon the relative rates, in the reaction zone, of absorption of SO2 and of the dissolution of calcium by the solution phase. Since the finished bisulphite liquor must contain a predetermined quantity of unbound SO2, it is obvious that fluctuations in the composition of the effluent from the first stage cause complementary fluctuations in the work to be performed in the second or enriching stage thereby complicating the control of operations in said second stage.

It is an objective of this invention to lessen these fluctuations in the amount of unbound SO2 in the effluent from the first stage through greatly increasing the "availability for dissolution" of the calcium. This is effected by introducing the solid phase materials into the reaction zone as a finely divided material having a relatively large surface area per unit of weight and in varying excessive amounts, thereby so greatly increasing the "availability for dissolution" of the solid phase materials that calcium will be dissolved and SO2 will be chemically bound to the calcium with essentially a minimum concentration of unbound SO2 in the solution phase.

In present practice limestone is introduced into and remains present in the reaction zone in relatively large lumps which have a relatively small and constant surface area per unit of weight and, therefore, a relatively low and constant "availability for dissolution" which limits the flexibility of the operation with respect to capacity, strength of solution produceable and loss of SO2 reagent.

It is an objective of this invention to eliminate the necessity for using this selected material through rendering feasible the use of all sizes of a chemically suitable limestone by reducing all sizes to a finely divided state.

The use of a reaction similar to that set forth in Equation III is possible in the case of treating dolomite (or dolomitic limestone) but is uneconomic in practice because of the slowness with which the reaction proceeds. To the best of our knowledge those employing dolomitic limestones, in the present state of the art, employ the reaction set forth in Equation II together with the preceding limestone decomposition step.

It is one of the objectives of this invention to render economic the use of dolomitic limestones in a process employing essentially the following reaction:

solid phase materials, there is constantly present in the reaction zone, an excess of solid phase products which are in a highly reactive state because of the large surface per unit of weight, which results in an increase in capacity of the reaction space in terms of lime dissolved per cubic foot of reaction space, further in improved efficiency of gas absorption (SO2 recovery), and further in the production of a solution phase leaving the thickener which will contain less unbound SO2 because the reaction has approached more nearly chemical equilibrium, and will therefore be more nearly of a uniform composition with respect to its lime-SO2 ratio than was heretofore possible. Having thus provided for a more constant ratio between the lime and SO2 in the resulting solution the invention further provides means for bypassing an amount of water around the tower so as to correct as desired the water-SO2 ratio in the solution phase of the slurry leaving the tower. The solution may then be fortified with further unbound SO2 in the precise amount desired to obtain the end product as liquor of predetermined qualities.

In view of the foregoing, the following features are noted:

According to one feature an effective excess of reactive solid phase material in slurry form is maintained in the reaction zone. Due to this effective excess a solution is produced which contains less unbound SO2, that is to say has a greater calcium-SO2 ratio than has been heretofore obtainable when basic rock carbonates have been employed. This feature comprises a step by which to separate the resultant slurry into substantially clear solution and remaining reactive slurry.

According to another feature the required effective excess of reactive slurry in the reaction zone is provided by a combination of fresh feed slurry plus a returned amount of separated reactive slurry, preferably by way of continuously recirculating the separated reactive slurry.

Another feature provides that substantially all of the liquor be produced from finely subdivided material or slurry which is kept in steady transit through the reaction zone.

Still other features are concerned with the phase of recirculation and cover more specifically means for controlling the amount of recirculated and total amount of slurry present in the reaction zone. They comprise a certain buffer tank

$$1Ca\text{---}Mg(CO_3)_2 + 6SO_2 + 2xH_2O \rightarrow \underline{Ca\text{---}Mg(HSO_3)_4 + 2SO_2 + (2x-2)H_2O + 2CO_2} \quad \text{Equation VI}$$
$$\text{Solution phase} \qquad \text{Gas}$$

through providing means by which the reaction will be effected at a more rapid rate.

To this end the invention proposes to employ pulverized limestone and finely divided solid phase intermediate-reaction products in water suspension and in an amount exceeding that which will be dissolved with a single passage through a reaction tower in which it is contacted with SO2 containing gases. Consequently a reaction product is drawn from the bottom of the tower which consists of a slurry the solution phase of which contains both bound and unbound SO2. This slurry passes through a separating stage such as a Dorr thickener or equivalent wherein a portion of the clear solution is separated from the slurry, the latter being returned to the tower. Due to the highly comminuted state of the limestone introduced and to this return of slurry containing finely-divided arrangement preferably in connection with certain pump and flow regulating means in the recirculation conduit.

Reference is herein made to the finely divided solid phase intermediate reaction products. These may be properly identified and described as follows:

As to physical characteristics they are in fine particle form. The pulverized limestone employed and described as the basic material is in fine particle form. When an amount of pulverized limestone is employed in the reaction zone in substantial excess above that required for chemical reaction with the SO2 supplied to the reaction zone, there results solid phase material and products that constitute solid portions of the slurry which leave the bottom of the reaction zone. This slurry just referred to essentially comprises the solid phase intermediate reaction product under discussion. This slurry may also contain some of the basic material not reacted upon. As to the intermediate reaction product, this results from the reaction of calcium or calcium and magnesium carbonates with the sulphur dioxide gas dissolved in the water employed in the reaction zone and which, as a matter of fact, is sulphurous acid. The reaction which necessarily results in the formation of this intermediate reaction product may be expressed as follows where limestone ($CaCO_3$) is employed:

$$1CaO \cdot CO_2 + 1SO_2 + xH_2O \rightarrow 1CaSO_3 + 1CO_2 + xH_2O$$
Equation VII Where dolomite limestone ($CaCO_3 \cdot MgCO_3$) is employed, the formation of the intermediate reaction products may be expressed as follows:

$$1CaO \cdot CO_2 + 1MgO \cdot CO_2 + 2SO_2 + xH_2O \rightarrow 1CaSO_3 + 1MgSO_3 + 2CO_2 + xH_2O$$
Equation VIII Natural limestone rock is largely calcium carbonate, the formula of which may be expressed as $CaCO_3$ or $CaO \cdot CO_2$. In other words, it may be viewed as one mol of calcium oxide combined with one mol of carbon dioxide. Likewise, natural dolomitic limestone rock is composed of varying proportions of calcium carbonate and magnesium carbonate. The calcium carbonate constituent may likewise be viewed as one mol of calcium oxide combined with one mol of carbon dioxide, and similarly the magnesium carbonate may be expressed as $MgCO_3$ or $MgO \cdot CO_2$ and viewed as composed of one mol of magnesium oxide and one mol of carbon dioxide.

Equations VII and VIII represent the formation of the intermediate reaction products, namely, calcium mono-sulphite ($CaSO_3$) and magnesium mono-sulphite ($MgSO_3$). Normally, calcium mono-sulphite would be present as solid phase, whereas magnesium mono-sulphite would normally exist as liquid phase, although under certain conditions a portion may exist as solid phase.

The solid phase intermediate reaction products and particularly calcium mono-sulphite, constitute a substantial part of the solid content of the slurry which is introduced into or returned to the reaction zone and which is relied upon for maintaining the process. It is hereafter pointed out that by the re-cycling or returning of the slurry that contains these intermediate products, it is possible to continue the process for a limited period of time even though outside make-up material is not being introduced during that period. However, for the relatively long continuous period of operation, an introduction of raw make-up material in fine particle form takes place and the recycling or returning of the sludge containing the intermediate solid phase products also takes place. It is manifest that the make-up material may be the natural lime rock in fine particle form, or it may be a material which is the same as or equivalent to the intermediate solid phase reaction products that result from the reactions that necessarily take place.

The ultimate formation of raw bi-sulphite liquor from the interaction of the intermediate solid phase reaction products with sulphur dioxide and water may be expressed as follows:—

Where limestone is employed, $$1CaSO_3 + 2SO_2 + xH_2O \rightarrow Ca(HSO_3)_2 + 1SO_2 + xH_2O$$
Equation IX Where dolomitic lime is employed, $$1CaSO_3 + 1MgSO_3 + 4SO_2 + xH_2O \rightarrow 1Ca(HSO_3)_2 + 1Mg(HSO_3)_2 + 2SO_2 + xH_2O$$
Equation X It will be noted that the bi-sulphite product of Equation IX will be equivalent to Equation III, and that the bi-sulphite product of Equation X will be equivalent to Equation VI. More specifically this invention contemplates providing an apparatus, system and method of continuous operation in which the raw material is ground in closed circuit with hydraulic classifying means, the resultant thin mixture of ground material and water being thickened to a density at which the thickening means is stable in operation and at which density the water content is considerably less than that required for the final product, the remaining amount of water being added in measured quantity for distribution to different phases of the process and in different controlled proportions to afford stable control of the process and provide for substantially complete utilization of the sulphur dioxide content of the gas supply. Increased extent of contact of gas with the limestone and increased detention of the limestone in the reaction zone without increased size of reaction or apparatus, is obtained through the use of an excess of the limestone over that required for complete absorption of the gas in chemical combination, which excess is made possible without clogging the absorption apparatus, by operating the absorption apparatus in closed circuit with separating means whereby excess lime-bearing solids may be withdrawn from the reaction zone along with the resultant sulphite liquor and returned to the reaction apparatus. This maintains the presence of an ample supply of the lime-bearing solids in all parts of the reaction zone even at the point of withdrawal of the resultant sulphite liquor and enables the use in a continuous process, of solids of a high degree of fineness.

By the use of suitable means for comminuting the lime-bearing solids, operated in closed circuit with hydraulic classifying means, a minimum spread of size is obtained which makes for stable production of a slurry of the desired density. The water removed for the purpose of increasing the density of the slurry is returned to the hydraulic classifying zone, leaving available, fresh water free from suspended solids and which would otherwise be required for such hydraulic classification, to be used as control water for regulating the density of the slurry and absorbing the sulphur dioxide at different stages of the process. The control water being free from suspended solids may be readily metered and applied at any point in the system without interfering with the proper functioning of any apparatus and without conveying solids to such zones as are intended to be free of solids. It is therefore possible immediately after metering, and before use in other parts of the system to pass the control water through any suitable form of scrubber such as a coke filled compartment for recovery of $SO_2$ from the waste gases.

After leaving the scrubber the measured supply of control water is preferably divided, part being added to the slurry of raw material to control the density of the mixture of solids and liquid as supplied to the reaction zone for contact with the gas, and part shunted around the reaction zone to a scrubber to absorb more $SO_2$ from the fresh supply of gas and later added to the finished product to increase the free SO₂ content thereof, the proportion comprising this latter part of the control water being preferably regulated to obtain substantial saturation without reducing the SO₂ content of the remainder of the gas supply below that required for the reaction zone.

Other objects and advantages of the invention will be apparent from a perusal of the following specification and the drawing accompanying the same.

The drawing is a diagrammatic representation of a system of apparatus for practicing the invention.

Referring to the drawing in detail, a track hopper 1 is arranged to receive the limestone rock from a car, not shown, which may be situated on a track above the hopper, the hopper feeding the rock to a hammer mill 2 where the pieces of rock which in the present instance are of a size of 6 inches or less, are reduced to a size passing about 8 to 10 inch mesh. Rock in excess of that supplied to the track hopper may be stored near by in a pile 3 for use when the shipments are delayed. The term limestone as used in the present specification and claims is intended to indicate any lime-bearing solids such as dolomite limestone, pure limestone or the like, although the invention is particularly adapted to the utilization of dolomite.

From the hammer mill, the crushed rock is conveyed through elevator 4 to a storage bin 5 from whence it is conveyed in predetermined quantity by means of a conveyor 6 to the feed hopper 7 of a wet-grinding ball mill 9. The measurement of quantity is preferably by weight and is maintained substantially constant in any known or other suitable manner as by using for the conveyor 6 a type known as a "Poidometer" which is a conveyor operable to automatically deliver material at a constant predetermined rate by weight. The ball mill is arranged as indicated for operation in closed circuit with a suitable hydraulic classifier 10 preferably a Dorr bowl classifier, the mill and classifier being arranged and operated to deliver at the bowl overflow a pulp of finely comminuted limestone, the oversize being returned over path 11 to the ball mill.

A pump 12 is arranged to take the overflow from the bowl 13 of the classifier over the path 14 and deliver it over the path 15 to the dolomite thickener 16 preferably situated at an elevation sufficiently above that of the classifier to permit the overflow from the thickener to be conveyed by gravity back to the classifier as indicated by the line of flow 17. Water is supplied in predetermined quantity from a constant level water tank 18 through a water line 19, water meter 20, water line 21, and branch lines 22 and 23 to the mill and classifier, the branch lines being provided with regulating valves 24—25 for apportioning the measured supply of water between the mill and classifier.

From the thickener, 16, the thickened slurry underflow is drawn through the slurry line 26 by a pump 27 arranged to discharge through a feed splitter 28 into the lines 29 and 30, leading respectively to the top of the thickener 16 and to an absorption tower 31, the feed splitter being normally adjusted to direct the greater portion of the slurry into the line 30 leading to the tower.

The absorption tower 31 may be of any known or other suitable type, and preferably comprises a central or middle section 32 in the form of a bubble tower, with top and bottom scrubber compartments 33 and 34 of any known or other suitable form preferably of the type comprising a coke filled chamber and well known in the art. The middle or bubble tower section constitutes the reaction zone of the system, its function being to effect efficient contacting of the gas with the mixture of water and limestone or dolomite. To this end it is separated from the top and bottom scrubbers by perforated diaphragms or partitions 35 and 36 respectively and divided into superposed bubble chambers 37 by the intermediate partitions 38 each with an upstanding, liquid level determining boot or sleeve 39 communicating with the chamber next below. A gas line 40 supplies sulphur dioxide gas (SO₂) from a source, not shown, to the bottom of the bottom scrubber, the gas passing through the several perforated partitions of the tower 31 to the top scrubber and out through the exhaust pipe 41. The SO₂ gas may be derived from any suitable source, preferably the well known sulphur burner, burning either substantially pure sulphur or pyrites to give a mixture of gases rich in SO₂.

The slurry line 30 connects with the top compartment of the bubble tower. Water in addition to that contained in the slurry is supplied to the absorption tower from the constant level tank 18 by way of water line 19 and branch line 42 through a suitable water meter 43 and valve 44. The branch line 42 connects with the upper portion of the top scrubber 33, the bottom of this scrubber connecting through pipe 45 and branch pipes 46 and 47 with the top compartment 37 and bottom scrubber 34 respectively. Valves 48 and 49 are included in the branch pipes 46 and 47 for properly apportioning the flow of liquid therethrough. A branch pipe 50 connects the line 42 with the pipe 45 for conducting all or a portion of the measured quantity of water to the pipe 45, valves 51, 52 and 53 being provided where shown for control of such connection. The lower portion of the bottom bubble chamber 37 connects through pipe line 54 with the feed inlet of an acid clarifier 55 from which the overflow is conducted through line 56 and branch line 57 to the sulphite liquor line 58. The bottom scrubber 34 discharges through a valve 59 to sulphite liquor line 58, and in order to enable the overflow from the acid clarifier 55 to discharge into the line 58 by way of the bottom scrubber, when desired, the overflow line 56 is connected through a branch pipe 60 to the top of the scrubber, suitable valves 61—62 being included in the branch pipes 57 and 60 for controlling these connections.

A pipe 63 connects the underflow discharge of the clarifier 55 to a pump 64 arranged to discharge through a feed splitter 65 into either or both lines 66 and 67, the feed splitter being normally adjusted to deliver the greater portion of the underflow material into the line 67. Line 66 leads to the feed inlet of the clarifier 55 while line 67 leads to the sump 68 of a pump 69 of the Wilfley type. The feed splitter 65 may be of any known or other suitable type operable to receive the discharge from the pump 64 and apportion it between the lines 66 and 67 in any desired ratio. The pump 69 raises the material through line 70 to a feed splitter 71 through which the material may be returned to the bubble tower through line 72, or to the sump 68, through line 73 in any apportionment desired.

The method is practiced as follows: The raw dolomite rock is fed into the hopper 1 and hammer mill 2 where it is reduced to about 8 to 10 mesh after which it is conveyed through elevator 4 to the storage bin 5. From the storage bin the crushed dolomite is fed to the wet-grinding ball mill 9 at a predetermined rate by the "Poidometer" conveyor 6, water being supplied to the mill through branch water line 22. The discharge from the mill passes into the classifier 10, the oversize returning to the mill while the fines of the desired degree of fineness overflow the bowl 18 and are elevated by the pump 12 to the feed inlet of the thickener 16, the mill and classifier being preferably arranged to deliver the finely comminuted dolomite to the thickener at a fineness of approximately 325 mesh and a dilution of approximately 8 to 1. The dolomite dewatered to a slurry of a dilution of about 1½ to 1 is discharged from the thickener as underflow through line 26, while the overflow from the thickener is returned to the classifier as indicated by flow line 17. To compensate for the water removed with the underflow, the required amount of make up water measured by the meter 29, for example 5 gallons per minute, is supplied by way of line 22 and the ball mill, any portion of the given total required being diverted into the classifier bowl by way of branch line 23. This closed-circuit grinding of the material which results in a narrow spread of sizes and substantial absence of colloidal fines, makes it possible to thicken the classifier overflow to a relatively high density by decantation, thus reducing the amount of fresh water required for make up in the closed-circuit between the classifier and thickener, and permitting a large proportion of the water required for the final product to be added in the form of fresh water free from suspended solids and therefore capable of being added through any kind of apparatus and at any phase in the process to effect stable control without introducing solids where not desired as in meters, scrubbers, regulating valves, etc. An advantage of operating the classifier in closed-circuit with the thickener overflow is that the water going into the final product as part of the thickener underflow is indicated by the meter 20.

The relatively dense dolomite slurry discharged from the thickener through line 26 passes by way of pump 27, feed splitter 28 and conduit 30, into the top bubble chamber 37 of the absorption tower where it is diluted with a portion of the predetermined quantity of control water supplied through meter 43 from the fresh water supply line 42 preferably entering the said top bubble chamber after passing through the top scrubber 33 to take up any $SO_2$ remaining in the gases leaving the top chamber through the scrubber 33. This recovery of $SO_2$ in the scrubber 33 is effected preferably by passing substantially all of the control water through the scrubber to the manifold connection 45 from whence part is directed into the top bubble chamber 37 through pipe 46 the remainder passing through pipe 47 into the top of the bottom scrubber 34. In the present example about 45 per cent of the control water passing through the meter 43 is diverted to the top bubble chamber 37 thinning the dolomite slurry to a dilution of approximately 7½ to 1. This leaves 55 per cent of the control water for the bottom scrubber. From the top chamber 37 the slurry passes on down through the succeeding chambers 37 by way of the overflow tubes or sleeves 39 to the bottom chamber 37 and from there to the feed inlet of the acid clarifier as indicated by flow line 54.

A mixture of gases containing $SO_2$ preferably in the ratio of about 16½ per cent enters the bottom of the scrubber 34 where it is scrubbed by the liquid entering through pipe 47, to produce a substantially saturated solution, the amount of water fed to the scrubber being so proportioned that the remaining gases passing up into the bubble tower or reaction zone will contain substantially 10 per cent $SO_2$. This gas passing up through the perforated partition 36 and succeeding perforated partitions 38 passes through the slurry in fine bubbles and effects conversion of the Ca—Mg constituents of the dolomite into a soluble sulphite. Any $SO_2$ remaining in the gases after passage through the top perforated partition 35 is recovered in the top scrubber as previously described.

The bisulphite liquor and remaining suspended dolomite flowing from the bottom bubble chamber into the acid clarifier is there decanted, the clear bisulphite liquor overflowing the clarifier and passing by way of conduits 56 and 57 to the conduit 58 where it joins the substantially saturated solution of $SO_2$ formed in the bottom scrubber and discharged therefrom through valve 59 into the conduit 58, thus forming bisulphite liquor of the desired qualities as to its total $SO_2$ and ratios of total combined and free $SO_2$. A solution of soda ash ($Na_2CO_3$) may be added during the process either through the top scrubber or directly into the bubble tower through pipe 74 or 75 from a suitable source 76.

The underflow from the acid clarifier, returns preferably at a dilution of 1½ to 1, to the top chamber of the bubble tower where it joins the slurry from the dolomite thickener 16 and the water or weak acid supplied through pipe 46.

The total amount of dolomite circulated through the tower in a given unit of time, is in excess, of the theoretical amount for combination with the $SO_2$ available in such given time and is preferably in the neighborhood of 300 per cent of such theoretical amount, and may be as much as 400 per cent or more, the use of the latter having the advantages of effecting a more complete absorption of the same given amount of gas, and speeding up the reaction with possible elimination of the top scrubber without substantial loss of gas.

As the amount of lime-bearing material with which the gas is contacted is a function of the rate of circulation of such material through the bubble tower, it will be clear that the present system of recirculation makes for increased capacity without coresponding increase in size of the reaction zone, and that by varying the rate of circulation, maintaining constant the instantaneous volume, the amount of material with which the gas is contacted may be varied without having to vary the size of the reaction zone (bubble tower).

As the total amount of solids circulated through the tower is the sum of the fresh supply from the dolomite thickener and the recirculated residue from the acid clarifier, control of the amount of material passing through the reaction zone may be effected by control of either or both of these sources of supply and if necessary either source may be used alone for a limited time.

When desired and especially where only a small portion of the control water is passed through the bottom scrubber, all or a part of the sulphite liquor from the acid clarifier may be passed through the bottom scrubber on its way to the final discharge conduit 58 by way of the pipe 60.

Control of the amount of slurry supplied to the bubble tower from the dolomite thickener may be effected by proper adjustment of the feed splitter 28 to divert more or less of the output of the pump 27 back into the thickener, while control of the slurry returned to the bubble tower from the acid-clarifier underflow may be effected by proper adjustment of the feed splitter 71 to divert more or less of the output of pump 69 back into the sump 68, the feed splitter 65 being accordingly adjusted to maintain the contents of the sump at a substantially constant level. The arrangement and method of use of the water meters 20 and 43 and the measuring conveyor 6, afford definite knowledge and control of the amount of water and solids going into the final product. These several features of control make for stability in operation and flexibility of control of process and final product.

While herein has been shown and described a system comprising a specific arrangement and kind of apparatus elements, and a specific example of a method of producing a desired product it is to be understood that the invention is not limited to such specific system and method but contemplates all such variants thereof as fairly fall within the scope of the appended claims.

Wherever the term limestone or natural limestone rock is employed in the claims, the same is to be broadly construed as comprehending any and all forms of limestone or limestone rock, regardless of whether it is pure limestone such as calcite or whether it is known as dolomitic limestone or magnesite which, as above pointed out, contain calcium and magnesium carbonates in various proportions.

Having thus described our invention, what we claim is:

1. The method of manufacturing raw sulphite liquor from limestone which comprises continuously bubbling $SO_2$ through a slurry of approximately 325 mesh limestone at a dilution of 7½ parts of water to 1 of limestone, continuously supplying the slurry in counter-current to the $SO_2$ at a rate at least 200 percent greater than that required to absorb all the $SO_2$ continuously withdrawing the resultant sulphite liquor and unconverted limestone from the zone of contact of $SO_2$ and slurry, separating the unconverted limestone from the sulphite liquor and continuously returning the unconverted limestone to the first mentioned supply of slurry as part thereof.

2. In a process of manufacturing sulphite liquor by contacting $SO_2$ with natural limestone rock and water, the method of controlling the amount of $SO_2$ absorption which comprises contacting a mixture of gases containing over 10 percent $SO_2$ with an amount of water sufficient to produce a solution which is substantially saturated with $SO_2$ after absorbing substantially all but 10 percent of the $SO_2$ content of said mixture of gases, passing the remaining $SO_2$ through a reaction zone at a given rate, passing comminuted natural limestone rock material in the presence of water through the same reaction zone, at a rate in excess of that required to absorb all of the $SO_2$ into chemical combination with the rock material, withdrawing the sulphite liquor and the remaining unconverted rock material, separating the sulphite liquor from the unconverted rock material, and adding to the separated sulphite liquor the saturated solution of $SO_2$.

3. In a process of manufacturing raw sulphite liquor by contacting $SO_2$ with natural limestone rock and water the method of controlling the amount of $SO_2$ absorption, which comprises wet comminuting the rock material to a fineness of approximately 325 mesh with a narrow limit of spread of sizes, dewatering the mixture of rock material and water to form a mixture having less water than that which is optimum for contacting with $SO_2$, rediluting the dewatered mixture with a supply of water to a degree suitable for effecting absorption of $SO_2$ by the rock material, contacting $SO_2$ with a second supply of additional water, contacting the remaining $SO_2$ with the said rediluted mixture, clarifying the resultant slurry mixture of sulphite liquor and unconverted rock by sedimentation, removing the settled unconverted rock slurry and adding said second supply of additional water to the clarified liquor.

4. The method of manufacturing bisulphite liquor from limestone, which comprises providing a slurry of finely comminuted limestone and water having a water content less than that required for the finished product, providing a supply of control water of a given amount sufficient to make up the total amount of water required for the finished product, passing said limestone slurry and a portion of said control water through a reaction zone, passing the remainder of said control water through a gas absorption zone, passing a mixture of gases containing over 10 percent $SO_2$ first into the gas absorption zone to effect absorption of part of the $SO_2$ by the said remainder of the control water to form a sulphurous acid solution, the control water being so apportioned between the reaction zone and the gas absorption zone that the portion passing into the gas absorption zone is just substantially sufficient to absorb substantially all but 10 percent of the $SO_2$ and form a substantially saturated solution, passing the remainder of the $SO_2$ through the reaction zone to effect conversion of a sufficient portion of the limestone to absorb substantially all of the $SO_2$, separating the resultant sulphite liquor from the limestone, and mixing the separated sulphite liquor and sulphurous acid solution to form the desired sulphite liquor product.

5. The method as claimed in claim 4 in which the apportionment of the control water is varied during continuing of the process to control the amount of sulphurous acid produced and added to form the resultant product.

6. The method of manufacturing sulphite liquor from limestone and the like which comprises providing a first mixture of finely comminuted limestone and water containing less than the amount of water required for the final product, providing a supply of make-up control water in an amount sufficient to make up the amount of water required for the finished product, adding a portion of the control water to the limestone mixture to form a second mixture, passing $SO_2$ through the diluted second mixture, separating the resultant sulphite liquor from the unconverted limestone, and adding the remainder of the control water to the sulphite liquor, said $SO_2$ being passed through the mixture of sulphite liquor and control water before passage through said second mixture.

7. In a process of manufacturing raw sulphite liquor by contacting $SO_2$ with natural limestone rock and water, the method of controlling the amount of $SO_2$ absorption with respect to the amounts of combined and uncombined $SO_2$, which comprises providing a rock slurry of greater density than that which is optimum for contacting with $SO_2$ and which is of suitable fineness for conversion of the rock by the SO₂, rediluting the dewatered mixture with a supply of water to a degree suitable for effecting absorption of SO₂ by the rock material, contacting SO₂ with a second supply of additional water, contacting the remaining SO₂ with the said rediluted mixture, clarifying the resultant liquor and unconverted rock by sedimentation, removing the settled unconverted rock slurry and adding said second supply of additional water to the clarified liquor.

8. In a process of manufacturing raw bisulphite liquor, the steps of intimately contacting in a continuous manner in a reaction zone an amount of SO₂ or SO₂ bearing gas with an amount of slurry, said slurry containing finely comminuted natural limestone rock, water, finely divided solid phase material from a previous cycle, and an aqueous solution of reaction products also from a previous cycle, which amount of slurry contains reactive solid phase material in excess of that which will dissolved through reaction with the SO₂, withdrawing the resulting slurry from the reaction zone, separating a portion of the solution from said resulting slurry, and continuously returning the remainder of said resulting slurry to the reaction zone.

9. A continuous process of manufacturing raw bisulphite liquor of predetermined characteristics by intimately contacting SO₂ gas with a slurry containing finely comminuted natural limestone rock and water, which process comprises passing through a reaction zone a supply of said slurry and a supply of SO₂ or SO₂-bearing gas and also passing together therewith through said reaction zone a second supply of slurry containing solid phase material and solution resulting from a previous cycle, said combined slurries providing an amount of reactive solid phase material in excess of that which will be dissolved through reaction with the SO₂, withdrawing the resulting slurry from the reaction zone, separating a portion of the solution from said resulting slurry, continuously returning the remainder of said resulting slurry to the reaction zone, and then subjecting the separated portion of said solution to the action of SO₂ gas for producing a raw bisulphite liquor of said predetermined characteristics.

10. In a process of manufacturing raw bisulphite liquor, the steps of intimately contacting in a reaction zone an amount of SO₂ or SO₂-bearing gas with an amount of slurry containing finely divided reactive material, said slurry containing finely comminuted natural limestone rock and water and containing finely divided reactive solid phase material in excess of that which will dissolve through reaction with said supply of SO₂, recovering from the slurry thus obtained as a result of the reaction, substantially clear solution by removing the excess of solid phase material, and returning to the reaction zone for further reaction with the SO₂ therein solid phase material thus removed.

11. In a process of manufacturing raw bisulphite liquor, the steps of intimately contacting in a reaction zone an amount of SO₂ or SO₂ bearing gas with an amount of slurry containing finely divided reactive material, said slurry containing finely comminuted natural limestone rock and water and containing reactive solid phase material in excess of that which will dissolve through reaction with the SO₂, said solid phase material being present in an amount sufficient to produce substantially all of the dissolved material, recovering from the slurry obtained as a result of the reaction substantially clear solution by removing the excess of solid phase material, and causing a return to the aforementioned reaction zone of solid phase material removed as indicated from the slurry last mentioned.

12. In a process of manufacturing raw bisulphite liquor of predetermined characteristics, the steps of intimately contacting in a reaction zone a continuous supply of SO₂ or SO₂ bearing gas with a continuous supply of slurry, said slurry containing finely comminuted natural limestone rock and water, and containing reactive solid phase material in excess of that which will dissolve through reaction with said supply of SO₂, withdrawing the resulting slurry from the reaction zone, separating the solution from the excess of reactive solid phase material in said resulting slurry, then subjecting the separated solution to the action of SO₂ gas so as to produce a finished raw bisulphite liquor of said predetermined characteristics, and returning to the reaction zone solid phase material left behind as a result of the separation of the solution therefrom.

13. In a process of manufacturing raw bisulphite liquor, the steps of intimately contacting a continuous supply of SO₂ or SO₂ bearing gas with a continuous supply of slurry by passing both through a reaction zone, said slurry being substantially composed of finely comminuted natural limestone rock, water, finely divided solid phase material from a previous cycle, and an aqueous solution of reaction products also from a previous cycle, said slurry being present in an amount which contains a multiple of that amount of solid phase material which will dissolve through reaction with the SO₂, said multiple amount presenting a relatively large effective surface to induce dissolution and chemical reaction, withdrawing the resulting slurry from the reaction zone, separating a portion of the solution from said resulting slurry, and continuously returning the remainder of said resulting slurry to the reaction zone at a rate to maintain said multiple amount of solid phase material.

14. In a process of manufacturing raw bisulphite liquor, the steps of intimately contacting in a reaction zone a supply of SO₂ or SO₂ bearing gas with a supply of slurry, said slurry containing finely comminuted natural limestone rock, water which has been used to absorb SO₂ from waste gases resulting from previous operation, finely divided solid phase material from a previous cycle and an aqueous solution of reaction products also from a previous cycle, said slurry containing reactive solid phase material in excess of that which will dissolve through reaction with the SO₂, withdrawing the resulting slurry from the reaction zone, separating a portion of the solution from said resulting slurry and returning the remainder of said resulting slurry to the reaction zone.

15. In a process of manufacturing raw bisulphite liquor, the steps of intimately contacting in a reaction zone an amount of SO₂ or SO₂-bearing gas with an amount of slurry containing finely divided reactive material, said slurry containing finely comminuted natural limestone rock, water, finely divided solid phase material from a previous operation, and an aqueous solution of reaction products also from a previous operation, the said amount of slurry containing solid phase material in excess of that which will dissolve through reaction with the SO₂, separating a portion of the solution from the resulting slurry and reutilizing the remainder of said resulting slurry in a subsequent operation.

16. In the process of manufacturing bi-sulphite liquor, the steps of intimately contacting in a continuous manner in a reaction zone an amount of $SO_2$ or $SO_2$-bearing gas with an amount of liquid-solid mixture providing a slurry as is hereinafter defined, said slurry containing water, a substantial quantity of material that comprises calcium or calcium and magnesium compounds which will react with sulphur dioxide and water to form calcium or calcium and magnesium bi-sulphites, and sulphurous acid resulting from the introduction of the $SO_2$ gas into the water, the solid portion or solid phase material of the mixture comprising in fine particle form make-up material and also material from a previous cycle, which slurry is at all times caused to contain an amount of reactive solid phase material in excess of that which will dissolve through reaction with the $SO_2$, and which slurry is caused to include calcium mono-sulphite as part thereof, withdrawing the resulting slurry from the reaction zone, separating a portion of the resulting raw bi-sulphite liquid from said withdrawn resulting slurry, continuously returning to the reaction zone a quantity of the remainder of said resulting slurry, and providing such make-up basic material as is essential for the performing of the process outlined.

17. A continuous process of manufacturing raw bi-sulphite liquor of predetermined characteristics by intimately contacting $SO_2$ gas with a slurry containing calcium carbonate in fine particle form and water, which process comprises passing through a reaction zone a supply of said slurry and a supply of $SO_2$ or $SO_2$-bearing gas and also passing together therewith through said reaction zone a second supply of slurry containing solid phase material and solution resulting from a previous cycle, said combined slurries providing an amount of reactive solid phase material in excess of that which will be dissolved through reaction with the $SO_2$, withdrawing the resulting slurry from the reaction zone, separating a quantity of the solution from said resulting slurry, continuously returning the remainder of said resulting slurry to the reaction zone, and then subjecting the separated quantity of said solution to the action of $SO_2$ gas for producing a raw bi-sulphite liquor of said predetermined characteristics.

ALVAH L. MILLER.
GEORGE M. DARBY.